United States Patent [19]

Kitahama

[11] 4,396,939

[45] Aug. 2, 1983

[54] CHROMAKEY EFFECT APPARATUS

[75] Inventor: Isamu Kitahama, Tokyo, Japan

[73] Assignee: Nippon Electric Co., Ltd., Tokyo, Japan

[21] Appl. No.: 270,464

[22] Filed: Jun. 4, 1981

[30] Foreign Application Priority Data

Jun. 9, 1980 [JP] Japan ................................. 55-77411

[51] Int. Cl.³ ........................................... H04N 9/535
[52] U.S. Cl. ....................................... 358/22; 358/26
[58] Field of Search ...................... 358/21, 22, 26, 35, 358/17, 19

[56] References Cited

U.S. PATENT DOCUMENTS

| | | | |
|---|---|---|---|
| 3,728,712 | 4/1973 | Nagai | 340/324 A |
| 3,732,360 | 5/1973 | Breimer et al. | 178/5.4 R |
| 4,117,512 | 9/1978 | Miyake et al. | 358/183 |
| 4,122,490 | 10/1978 | Lish | 358/22 |
| 4,206,474 | 6/1980 | Herrmann et al. | 358/22 |
| 4,240,104 | 12/1980 | Taylor et al. | 358/22 |

FOREIGN PATENT DOCUMENTS 55-56771  4/1980  Japan ................................. 358/22

OTHER PUBLICATIONS

SMPTE Journal, vol. 90, pp. 107–112, Feb. 1981.

*Primary Examiner*—Robert L. Richardson
*Attorney, Agent, or Firm*—Sughrue, Mion, Zinn, Macpeak & Seas

[57] ABSTRACT

A chromakey effect apparatus including a color-killing subcarrier-generating circuit which generates a color-killing subcarrier which completely kills color even when the hue or saturation of the chromakey area is changed and which also kills the color while simultaneously converting the color. Furthermore, the apparatus is capable of both chromakeying only the chromakey area even when there are many portions having the same color as the chromakey area, and also chromakeying a desired portion even when the desired portion includes a part having different colors. In addition, the apparatus is capable of inserting another television signal into only a desired portion of the chromakey area and of converting the color of the remaining portion of the chromakey area.

6 Claims, 12 Drawing Figures

CHROMAKEY EFFECT APPARATUS

BACKGROUND OF THE INVENTION

The present invention relates to an apparatus for producing special television effects, and more particularly to a chromakey effect apparatus.

The chromakey effect apparatus works to insert a picture by utilizing the difference in hue of color signals. So far, however, an unnatural appearance developed at the border of the inserted picture. A chromakey generating apparatus which is free from the abovementioned defect was announced in the SMPTE's 121st Technical Conference held in Los Angeles on Oct. 22, 1979, and has been disclosed in an SMPTE journal articles, "High Quality Montage Pictures by a New Color Killer Soft Chromakey System", Vol. 90, February, 1981, pages 107–112. According to this apparatus, the objects are achieved by utilizing a linear gate and by employing a color killer circuit.

The prior art chromakey apparatus disclosed in the above-mentioned article consists of a chromakey signal generating unit, a soft chromakey signal generating unit, and a color killing unit. The color killing unit produces a color killing subcarrier for cancelling the color of a portion in which another picture will be inserted. In the color killing unit of the prior art shown in FIG. 7 of the above-mentioned article, the phase and amplitude information corresponding to the hue and saturation of a chromakey area, for example, a chromakey area, are memorized in the memories, respectively, and the color killing signal is produced in response to the phase and amplitude information stored in the memories. In this case, the particular portion of the chromakey area is specified by a window gate signal in order to memorize the phase and amplitude information. Therefore, when the saturation or hue of the chromakey area is changed, the color will not be killed completely unless the phase and amplitude information are re-sampled and stored again in the memories, and it becomes difficult to obtain chromakey effect of good quality. This means that a limitation is imposed on the ranges for moving key cameras.

Further, although the hue and saturation of the chromakey area portion can be changed in order to convert the color by utilizing the color killing function, it is difficult to kill the color and to convert the color simultaneously at different portions respectively.

If, outside of the chromakey area portion, a portion having the same color of the chromakey area is contained in the TV picture, that portion, which is not to be chromakeyed, would be chromakeyed. Therefore, if a person wearing blue clothing stands in front of the chromakey area, the other picture is inserted into the chromakey area as well as the portion corresponding to the blue clothing. Consequently the person is not allowed to wear blue clothing or a blue necktie.

Furthermore, when the chromakey area portion is small, the chromakey effect cannot be effected up to the outer side of the chromakey area. Moreover, the chromakey effect cannot be effected perfectly when characters of other colors are contained in the chromakey area.

A first object of the present invention, therefore, is to provide a chromakey effect apparatus which is capable of reliably killing color even when the hue or saturation of the chromakey area is changed.

A second object of the present invention is to provide a chromakey effect apparatus which kills the color while simultaneously converting the color, in order to obtain effects that are not found in the prior art.

A third object of the present invention is to provide a chromakey effect apparatus which is capable of reliably chromakeying only the chromakey area even when there are many portions having the same color as the chromakey area.

A fourth object of the present invention is to provide a chromakey effect apparatus which is capable of reliably chromakeying a desired portion even when the desired portion includes a part having different colors.

A fifth object of the present invention is to provide a chromakey effect apparatus which is capable of producing a monitor picture signal which indicates a region to be effected.

According to the present invention, there is provided a color killing subcarrier generating circuit which is capable of canceling the color of the chromakey area completely even when the hue or saturation of the chromakey area is changed. The color killing subcarrier generating circuit of the invention comprises means for extracting the subcarrier from the television signal containing the chromakey area, means for receiving a reference subcarrier and for shifting the phase of the reference subcarrier in response to a phase control voltage, gain control means for controlling the amplitude of the reference subcarrier delivered from said phase shifting means in response to a gain control voltage, phase comparator means for comparing the phase of the subcarrier delivered from said extracting means with the phase of the reference subcarrier delivered from said phase shifting means, first supplying means for supplying the compared result to said phase shifting means as said phase control voltage, means for comparing the amplitude of the subcarrier delivered from said extracting means with the amplitude of the reference subcarrier delivered from said phase shifting means, and second supplying means for supplying the compared result of said comparing means to said gain control means as said gain control voltage.

Further, according to another aspect of the present invention, there is provided a chromakey effect apparatus which is capable of inserting another television signal into only a desired portion of the chromakey area and of converting the color of the remaining portion of the chromakey area. The chromakey effect apparatus comprises an area signal generating circuit to restrict a portion to be chromakeyed and a color conversion circuit.

BRIEF DESCRIPTION OF THE DRAWINGS

Referring to FIG. 1, a prior art chromakey effect generating apparatus comprises a chromakey signal generating unit 1, a soft chromakey signal generating unit 2 and a color killing unit 3. The color killing unit 3 has many disadvantages as described above.

FIG. 2 shows a color killing subcarrier generating unit according to the present invention. In FIG. 2, a chromakey signal delivered from a chromakey signal generating circuit 13, which corresponds to the blocks 1 and 2 shown in FIG. 1, is supplied to a sample pulse generating circuit 5 which produces a sample pulse that is delay by about 1 $\mu$S in the horizontal direction from the leading edge of the chromakey signal. An NTSC television signal containing the chromakey area from the input terminal 6 is sent to a band-pass filter 7 where the subcarrier component is extracted. To an input terminal 8 is supplied a reference subcarrier. The reference subcarrier is sent through a phase shifter 9, which shifts the phase of the reference subcarrier in response to a control voltage, to a phase comparator 10, to an amplitude comparator including a multiplier 11, and to a gain control circuit 12 which changes the amplitude of the reference subcarrier in response to a control voltage.

Figure 1:
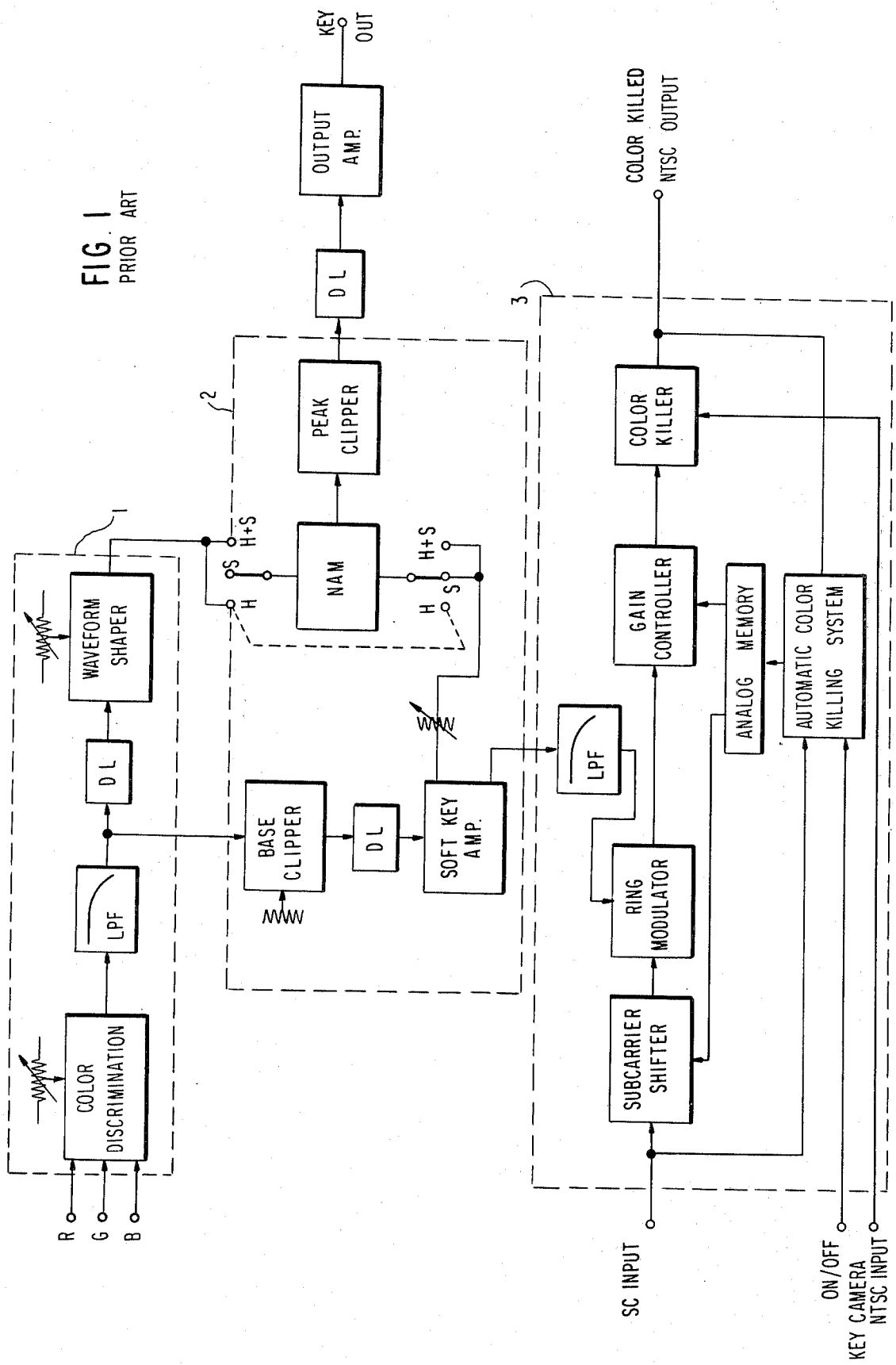
FIG. 1 is a diagram illustrating a prior art chromakey effect apparatus.

The phase comparator 10 consists of a 90-degree delay unit 10a and a multiplier 10b.

The subcarrier extracted by the band-pass filter 7 and the reference subcarrier which has passed through the 90-degree delay unit 10a are multiplied together by the multiplier 10b, and the output of the multiplier 10b is sent to a sample holding circuit 14 which holds the output of the multiplier 10b at the timing of the sample pulse and which sends its output as the control voltage to the phase shifter 9. The feedback loop so works that the phase of the reference subcarrier through the phase shifter 9 becomes equal to the phase of the subcarrier of the chromakey area in the NTSC television signal introduced from the terminal 6.

On the other hand, the subcarrier extracted by the band-pass filter 7 and the reference subcarrier from the phase shifter 9 are multiplied together by the multiplier 11, and the output thereof is fed to a sample holding circuit 15 which holds the multiplied result at the timing of the sample pulse and which sends the multiplied result as the control voltage to the gain control circuit 12. The forward loop so works that the amplitude of the subcarrier through the gain control circuit 12 becomes equal to the amplitude of subcarrier in the chromakey area in the NTSC television signal introduced from the terminal 6.

The chromakey signal generating portion 13 prepares a soft chromakey signal or a hard chromakey signal. The method of producing the chromakey signal has been described in the article mentioned earlier, and is not illustrated here.

Figure 3:
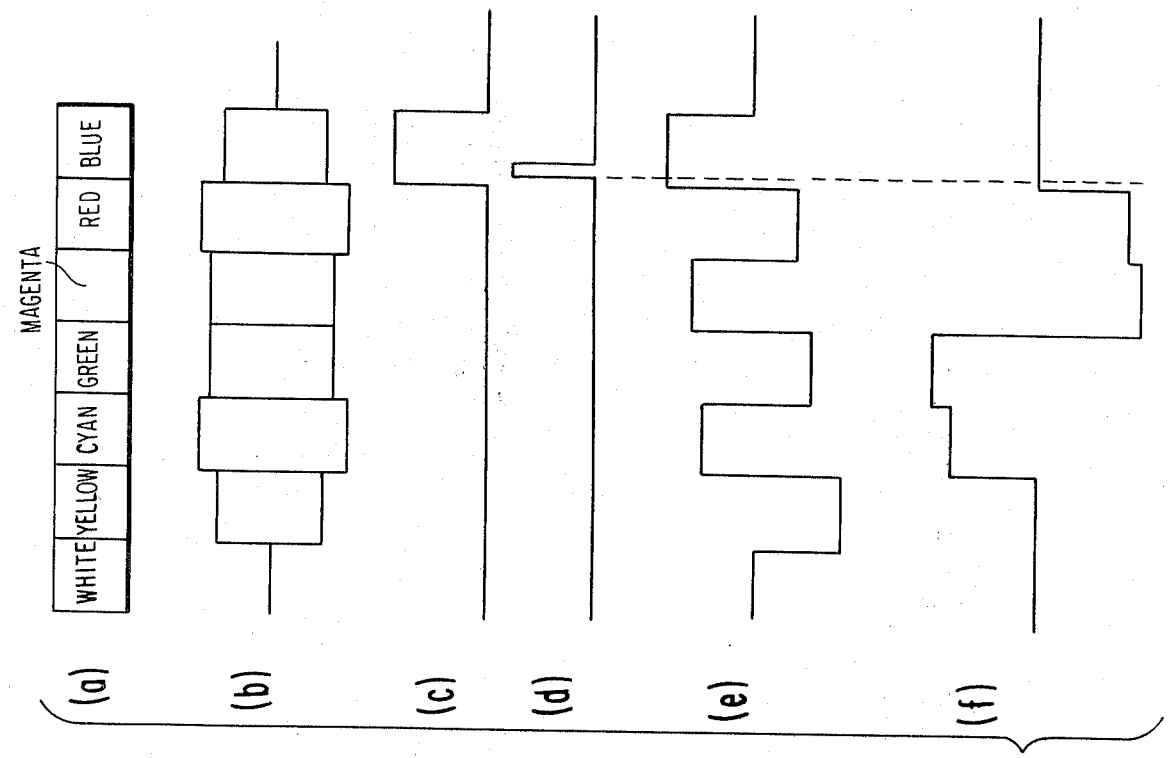
FIGS. 3(a), (b), (c), (d), (e) and (f) illustrate color bars and waveforms for explaining the operation of the present invention.
Figure 2:
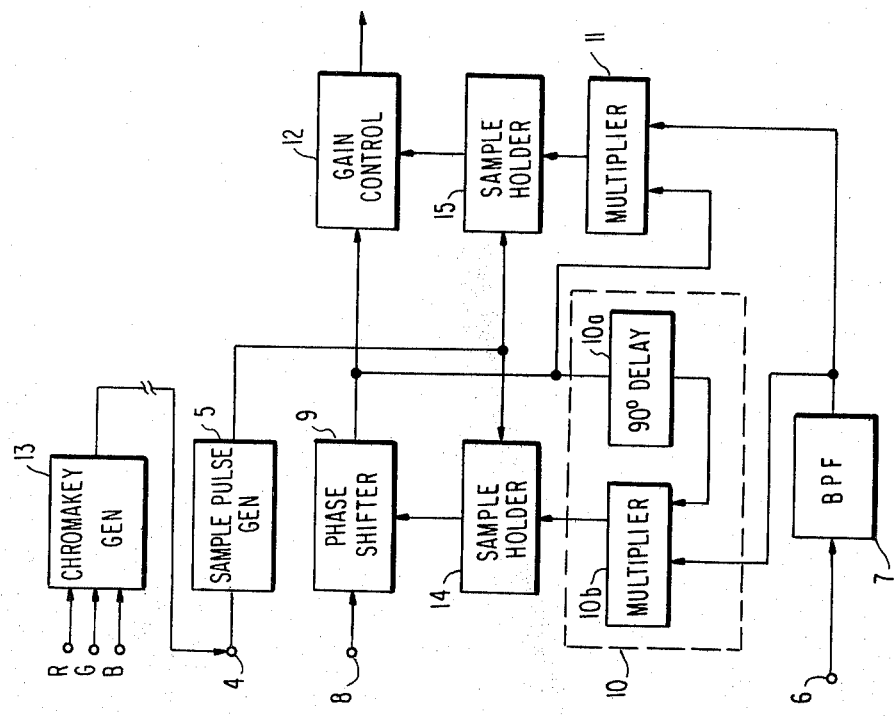
FIG. 2 is a diagram illustrating a color killing subcarrier generating unit according to the present invention.

FIG. 3(a) shows color bars ranging from white to blue which indicate an example of the television signal supplied to the terminal 6. FIG. 3(b) shows subcarrier signals corresponding to the color bars shown in FIG. 3(a). FIG. 3(c) shows a chromakey signal which corresponds to blue among color bars shown in FIG. 3(a). FIG. 3(d) shows the sample pulse produced in the sample pulse generating circuit 5. FIG. 3(e) shows the output of the multiplier 10b. FIG. 3(f) shows the output of the multiplier 11. The color killing subcarrier obtained by the setup of FIG. 2 accurately follows the change in hue or saturation of the chromakey area and, hence, no limitation is imposed on the movement of the camera which takes the chromakey area.

Figure 4:
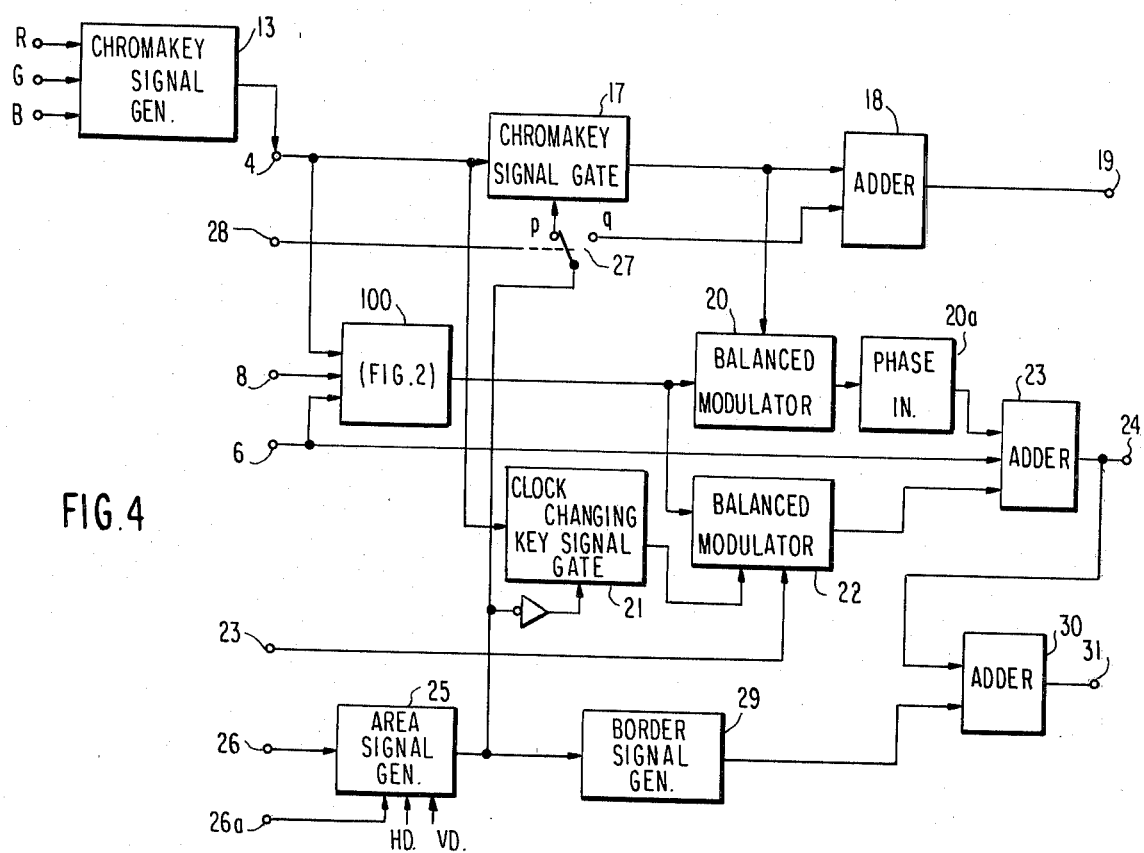
FIG. 4 is a diagram illustrating an embodiment according to the present invention.

FIG. 4 is a diagram illustrating an embodiment of the present invention, wherein the chromakey signal fed to the terminal 4 is sent to a chromakey signal output terminal 19 through a chromakey signal gate 17 and an adder 18. The color killing subcarrier from the unit 100 (shown in FIG. 2) and the chromakey signal from the gate 17 are sent to a blanced modulator 20 where the color killing subcarrier is passed for a period of the chromakey signal. The color killing subcarrier from the modulator 20 is supplied to a phase-inverter 20a. On the other hand, the chromakey signal from the terminal 4 is also fed to another balanced modulator 22 through a color conversion key signal gate 21 that operates alternately relative to the chromakey signal gate 17. In the modulator 22, the color killing subcarrier from unit 100 is changed in respect to phase and amplitude in response to a hue control signal and a saturation control signal from a terminal 23. The NTSC television signal including the chromakey area from the terminal 6, the color killing subcarrier from the phase-inverter 20a and the color conversion subcarrier signal are added together by an adder 23. At the output of the adder 23, the color of the portion to be chromakeyed in the chromakey area is completely killed, and the color of the remaining portion in the chromakey area is converted to another color. The color-killed and color-converted NTSC television signal is supplied to an output terminal 24. According to the present invention, the color-killing operation and color-converting operation can be performed simultaneously.

The chromakey signal gate 17 and the color conversion key signal gate 21 operate alternately relative each other. Namely, when the gate 17 is closed, the gate 21 is opened. Control signals for the gates 17 and 21 are produced at an area signal generating circuit 25. The area signal specifies the area defined by any vertical and horizontal sides on a television picture. The area signal can be easily formed by producing saw-tooth waves of a vertical scanning period and a horizontal scanning period, and by slicing them at predetermined levels, respectively. To the area signal generating circuit 25 is supplied from a terminal 26 control signals which determine the position and size of the area in the horizontal and vertical directions. If the polarity of the area signal is reversed, the region which can be chromakeyed is reversed as a matter of course. The polarity control signal is supplied to a terminal 26a.

Figure 5:
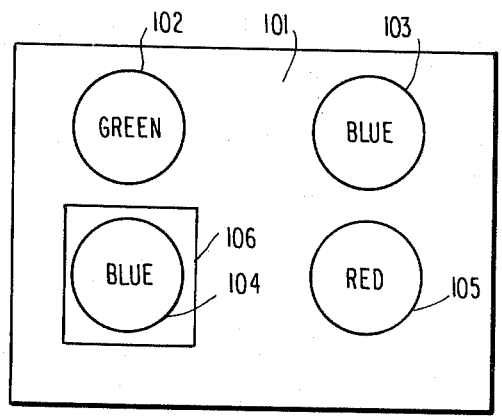
FIGS. 5 and 6 are diagrams illustrating an effect picture obtained according to the present invention.

FIG. 5 shows one example of an effect picture. The invention will be explained below in further detail with reference to the effect picture. Referring to FIG. 5, there are a green circle 102, blue circles 103 and 104, and a red circle 105 on a white background 101. If another picture is to be inserted in the portion of the blue circle 104, the area signal is generated that corresponds to an area 106. Therefore, if the chromakey signal gate 17 is opened only in the inner side of the frame 106, only the circle 104 is chromakeyed even when the chromakey signals from the terminal 4 correspond to both the circles 103 and 104. When it is desired to change the color, i.e., the hue and saturation, of the blue circle 103, the phase and amplitude of the subcarrier should be changed at the balanced modulator 22. In other words, according to the present invention, even when there are plural portions having the chromakey area color, the portion to be chromakeyed can be specified by the area signal so that only the desired portion can be chromakeyed.

Referring to FIG. 4 again, the area signal is supplied to the chromakey signal gate 17 through a switch 27. If now the switch 27 is changed from a contact p to a contact q, the area signal is fed to the adder circuit 18. Here, when the contact q is selected, the gate 17 assumes the pass-through state. By feeding the area signal to the adder circuit 18, the outer side or the inner side of the area can be forcibly converted into a region that is to be chromakeyed. The outer side or the inner side of the area can be selected by the polarity control signal from the terminal 26a. Namely, according to the present invention, it is also allowable to insert another picture into the region other than the chromakey area. Furthermore, it is possible to reliably insert another picture into the chromakey area even when the chromakey area includes a part having different color. The switch 27 is controlled by a control signal from an input terminal 28.

Figure 6:
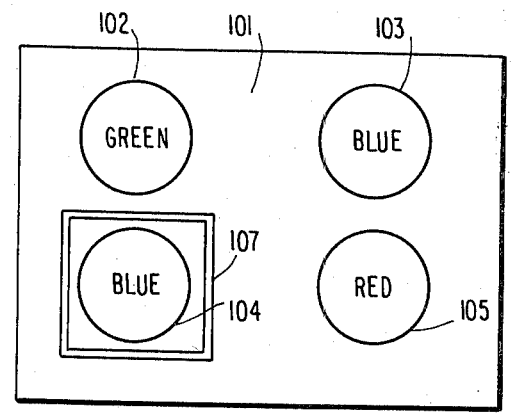

In FIG. 4, the area signal from the area signal generating circuit 25 is also sent to a border generating circuit 29 which produces a border signal that corresponds to the area specified by the area signal generating circuit 25. The color-killed and color-converted NTSC signal from the adder 23 and the border signal are added together by the adder 30, and the mixed signal is sent to a monitor output terminal 31. The picture obtained from the monitor output terminal 31 has the border 107 which can be visually recognized as shown in FIG. 6. According to the present invention, it is possible to precisely execute many chromakey effects while making reference to the monitored picture.

Figure 7:
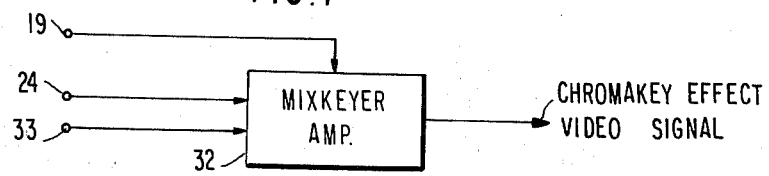
FIG. 7 is a diagram illustrating a mix-keyer amplifier which combines the picture relying upon a chromakey signal.

FIG. 7 shows a mix-keyer amplifier 32 which combines video signals in response to the chromakey signal from the terminal 19. To the mix-keyer amplifier 32, a television signal to be inserted is supplied from a terminal 33, and inserted into the chromakey area contained in the television signal from the terminal 24.

What is claimed is:

1. A color killing subcarrier generating circuit for a chromakey effect apparatus which generates a color killing subcarrier, comprising:
   means for extracting the subcarrier from a television signal containing the chromakey area;
   means for receiving a reference subcarrier and for shifting the phase of the reference subcarrier in response to a phase control voltage;
   gain control means for controlling the amplitude of the reference subcarrier delivered from said phase shifting means in response to a gain control voltage;
   phase comparator means for comparing the phase of the subcarrier delivered from said extracting means with the phase of the reference subcarrier delivered from said phase shifting means;
   first supplying means for supplying the compared result to said phase shifting means as said phase control voltage;
   means for comparing the amplitude of the subcarrier delivered from said extracting means with the amplitude of the reference subcarrier delivered from said phase shifting means; and
   second supplying means for supplying the compared result of said comparing means to said gain control means as said gain control voltage.

2. A color killing subcarrier generating circuit as claimed in claim 1, further comprising means for receiving red, green and blue channel television signals containing a chromakey area and for producing a chromakey signal and sample pulse generating means responsive to said chromakey signal, for generating a sample pulse corresponding to said chromakey area;
   said first supplying means including a sample holding circuit for holding the output of said phase comparator means at the timing of said sample pulse, and
   said second supplying means including a sample holding circuit for holding the output of said comparing means at the timing of said sample pulse.

3. A chromakey effect apparatus comprising:
   means for receiving red, green and blue channel television signals containing a chromakey area and for producing a chromakey signal;
   means for generating an area signal to restrict a desired region on a television picture;
   gate means responsive to said area signal for passing the chromakey signal;
   color killing subcarrier generating means for generating a color killing subcarrier to cancel the color of the chromakey area;
   adder means for adding said color killing subcarrier to the television signal containing the chromakey area at the timing of the key signal fed from said gate means; and
   means for keying another television signal into the television signal fed from said adder means at the timing of the key signal supplied from said gate means.

4. A chromakey effect apparatus comprising:
   means for receiving red, green and blue channel television signals containing a chromakey area and for producing a chromakey signal;
   means for generating an area signal to restrict a desired region on a television picture;
   color killing subcarrier generating means for generating a color killing subcarrier to cancel the color of the chromakey area;
   first adder means for adding said color killing subcarrier to the television signal containing the chromakey area at the timing of the chromakey signal;
   second adder means for adding said area signal to said chromakey signal; and
   means for keying another television signal into the television signal fed from said first adder means at the timing of the key signal supplied from said second adder means.

5. A chromakey effect apparatus comprising:
   means for receiving television signals containing a chromakey area and for producing a chromakey signal;
   means for generating an area signal to restrict a desired region on a television picture;
   first and second gate means responsive to said area signal and operative alternatively for passing said chromakey signal;
   color killing subcarrier generating means for generating a color killing subcarrier to cancel the color of the chromakey area;
   color conversion subcarrier generating means for generating a color conversion subcarrier having a predetermined phase and an amplitude;
   adder means for adding the color killing subcarrier to the television signal containing the chromakey area at the timing of the output of said first gate means, and adding the color conversion subcarrier to said television signal at the timing of the output of said second gate means; and
   means for keying another television signal into the television signal fed from said adder means at the timing of the output of said first gate means.

6. A chromakey effect apparatus as claimed in claim 3, 4, or 5, further comprising means receiving said area signal for producing a border signal.

* * * * *

UNITED STATES PATENT AND TRADEMARK OFFICE
CERTIFICATE OF CORRECTION

PATENT NO. : 4,396,939

DATED : August 2, 1983

INVENTOR(S) : Isamu Kitahama

It is certified that error appears in the above-identified patent and that said Letters Patent is hereby corrected as shown below:

On the title page add the following priority data:

-- June 9, 1980    Japan    55-77412 --

Signed and Sealed this

Nineteenth Day of June 1984

[SEAL]

Attest:

GERALD J. MOSSINGHOFF

Attesting Officer

Commissioner of Patents and Trademarks